United States Patent [19]

Binon

[11] Patent Number: 5,242,899
[45] Date of Patent: Sep. 7, 1993

[54] EMULSFIYING AGENT, REVERSE EMULSIONS PRODUCED USING THIS EMULSIFYING AGENT AND USE OF THESE EMULSIONS IN DRILLING WELLS

[75] Inventor: Jean-Pierre Binon, Saint-Raphael, France

[73] Assignee: Total Compagnie Franciase Des Petroles, Paris, France

[21] Appl. No.: 826,102

[22] Filed: Jan. 27, 1992

Related U.S. Application Data

[62] Division of Ser. No. 577,701, Sep. 5, 1990, abandoned.

[30] Foreign Application Priority Data

Sep. 5, 1989 [FR] France .................. 89 11601

[51] Int. Cl.$^5$ .............................. C09K 7/02
[52] U.S. Cl. ......................... 507/119; 526/320
[58] Field of Search ..................... 507/119; 526/320

[56] References Cited

U.S. PATENT DOCUMENTS

| | | | |
|---|---|---|---|
| 4,228,265 | 10/1980 | Ohishi et al. | 526/320 X |
| 4,381,241 | 4/1983 | Romenesko et al. | |
| 4,429,097 | 1/1984 | Chang et al. | 526/320 X |
| 4,745,154 | 5/1988 | Ruffner | |
| 4,985,507 | 1/1991 | Yoshida et al. | 526/320 X |

FOREIGN PATENT DOCUMENTS 0019584 4/1980 European Pat. Off.
3311752 10/1984 Fed. Rep. of Germany ...... 526/320
663702 12/1951 United Kingdom ............... 526/320

Primary Examiner—Gary Geist
Attorney, Agent, or Firm—Sughrue, Mion, Zinn Macpeak & Seas

[57] ABSTRACT

An emulsifying agent according to formula (I) having a molecular weight of between 3000 and 10000:

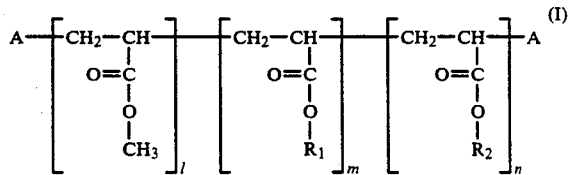

where A represents a terminal group for polyacrylates $R_1$ represents an oleyl group containing up to 20 mol % stearyl groups: $R_2$ is a residue with the formula $-(CH_2H_4O)_x(C_3H_16O)_y-CH_3$, where x is between 8 and 24 and y is between 0.75 and 2.25; l is between 1 and 3 is between 0.85 and 3.5; and n is between 0.12 and 0.5. A method of forming a reverse emulsion using this emulsifying agent. A heavy reverse emulsion, without solids comprising: 10 to 70% by volume of a dispersed brine phase having a density of between 1.20 and 2.77; 90 to 30% by volume of a continuous oil phase, and 15 to 60 g/liter of this emulsifying agent.

6 Claims, 13 Drawing Sheets

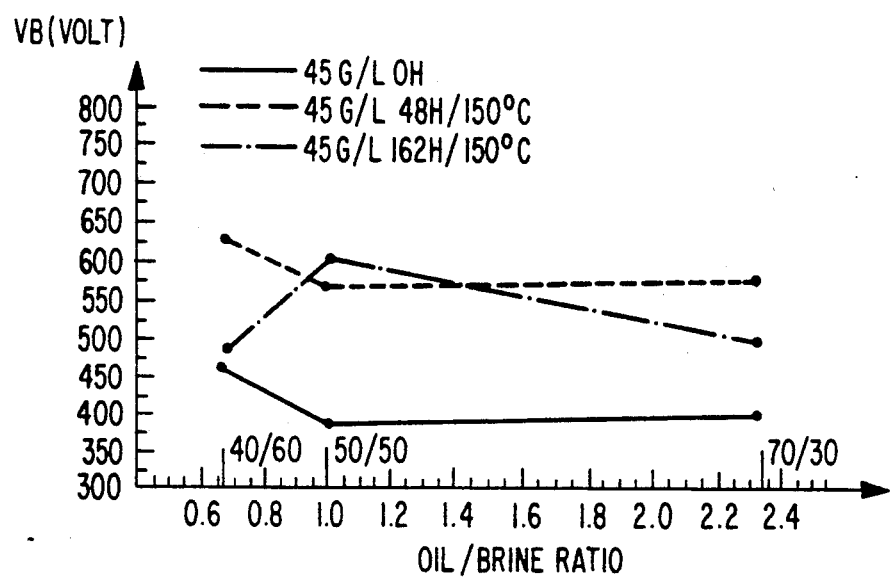
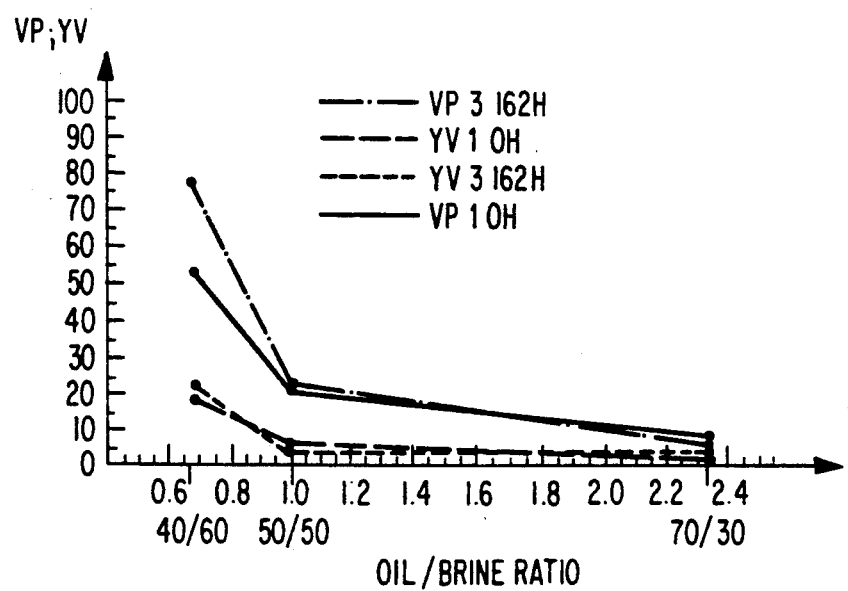

EMULSIFYING AGENT, REVERSE EMULSIONS PRODUCED USING THIS EMULSIFYING AGENT AND USE OF THESE EMULSIONS IN DRILLING WELLS

This is a divisional of application Ser. No. 07/577,701 filed Sep. 5, 1990, now abandoned.

The present invention relates to a novel emulsifying agent. It also relates to reverse emulsions of water in oil, produced using this emulsifying agent, and the use of these reverse emulsions in mining and drilling oil or geothermal wells.

The reverse emulsions conventionally used in mining and drilling generally contain up to 50% by volume of a brine solution of different salts or mixtures of salts 50% by volume of oil, one or several oil-soluble emulsifying agents and a solid phase. The solid phase is used to adjust the density of the emulsion by acting as an oil hardener; and it controls the filtration and regulates the viscosity of the emulsion.

When high pressures are likely to be encountered in well drilling, weighting solids, such as barium sulfate or calcium carbonate are used. However these solids can seriously damage the reservoir.

To overcome this problem, it has been proposed to use weighting agents not containing solids, such as simple or complex heavy brines based on salts such as $CaBr_2$ and/or $ZnBr_2$, $CaCl_2$, $NaCl$, $KCl$, and $K_2CO_3$.

Conventional reverse emulsion mud systems using these heavy brines are not temperature-stable emulsions. Attempts to make these mud systems temperature stable by adjusting the oil/brine ratio, by increasing the concentration of the emulsifying agents, and by saponifying the emulsifying agents with alkaline or alkaline earth salts such as $Ca(OH)_2$ have been unsuccessful. The temperature instability of these reverse emulsified muds results in precipitation of the salts; a segregation of the phases or coalescence; or even a fractionation of the oil after manufacture of the emulsion before or after aging at 150° C.

In addition, the use of lime or alkaline compounds can pose problems of compatibility with certain salts, which are only stable at a weakly acid pH.

Two known reverse emulsion compositions and their respective problems are discussed below.

COMPOSITION A

This composition, has a specific mass of 1.15 g/cm$^3$. It is composed of a 200 HDF oil having a density of 0.817 (sold by the TOTAL Group) and a mixed $CaBr_2$—$CaCl_2$ brine having a density of 1.63. The H/S (oil/brine) ratio of this composition is 60/40.

This emulsion further contains the agents sold under the following names:
 VERSAMOD: 20 g/liter,
 VERSAMUL: 23 g/liter,
 DOVAMUL HV: 9 g/liter,
as well as 12 g/liter of $Ca(OH)_2$.

When manufactured such a composition has satisfactory rheological characteristics (plastic viscosity VP and Yield Value YV):
 VP=20
 YV=13.

Its electrical stability is also satisfactory (1260 volts at 60° C.). It has a weak filtration rate (3 cm$^3$ of oil in accordance with the API 13 test) but forms a very thick deposit ("cake").

However, after aging at 150° C. for 24 hours, the emulsion of this composition undergoes segregation of the phases and the salts precipitate.

COMPOSITION B

This composition was proposed by a service company and has a density of 1.15. Like Composition A, it contains a 200 HDF oil of a density of 0.817 mixed with $CaBr_2$ or $CaCl_2$ brine having a density of 1.63. In addition, it contains the following additives (some of which are designated by their trade names):
 KENCAL (emulsifying agent): 8 cm$^3$/liter,
 KENOL (emulsifying agent): 24 cm$^3$/liter,
 F54 (emulsifying agent): 15 cm$^3$/liter,
 RF3 (filtrate reducer): 10 cm$^3$/liter,
 $Ca(OH)_2$: 5 g/liter.

When manufactured, this mud has the correct rheological characteristics (VP=20, YV=11), a satisfactory electrical stability (1100 volts at 60° C.), and a weak filtration rate on the order of 5 cm$^3$ of oil.

Unfortunately, after aging at 150° C. for 13 days, this emulsion is unstable. Moreover, it has a strong tendency to gel.

U.S. Pat. No. 4,381,241, teaches using a polydiorganosiloxane emulsifying agent to produce a reverse emulsion without solids. This emulsion, however, has been shown to be unstable after 24 hours at a temperature of 150° C. Moreover, the complex $CaBr_2$—$ZnBr_2$ brine phase used in the Examples of this patent is very oxidizing and degrades with a release of HBr, which reacts with the emulsifying agent.

U.S. Pat. No. 4,421,656, teaches overcoming the disadvantages of U.S. Pat. No. 4,381,241 by combining an organopolysiloxane copolymer resin with the polydiorganosiloxane that acts as the base emulsifying agent. However, tests have shown that in emulsions produced using this composition the brine exhibited phase segregation after static aging for 24 hours at 150° C.

Known emulsifying agents used for the production of heavy reverse emulsions which can be used in drilling wells, generally have the following disadvantages:
 instability of the emulsion at temperatures above 150° C. (at these temperatures the phases segregate or coalesce and the salts precipitate);
 presence of solids which are harmful to the integrity of the reservoirs being drilled (the phenomena known as the appearance of "skin").

SUMMARY OF THE INVENTION

One object of the present invention is to overcome the disadvantages of the known art with an emulsifying agent that enables reverse high density emulsions that are pressure- and temperature-stable, produced using a heavy brine and a low density oil which can be used in drillings, without damaging the permeability of the reservoirs being drilled.

Another object of the invention is a reverse emulsion emulsifying agent that permits the formation of a reverse emulsion between two very different density phases and prevents the problems of segregation of the liquid phases, of sedimentation of heavy droplets of brine, and the coalescence of fine droplets of brine dispersed in the oil phase.

A further object of the invention is the production, using the emulsifying agent of the invention, of heavy reverse emulsions without solids, which can be used in mining or drilling for oil or geothermal reserves, without risk of damaging the respective reservoirs being drilled.

These and other objects of the invention are satisfied by an emulsifying agent according to formula (I) having a molecular weight of between 3000 and 10000: preferably between 4000 to 8000

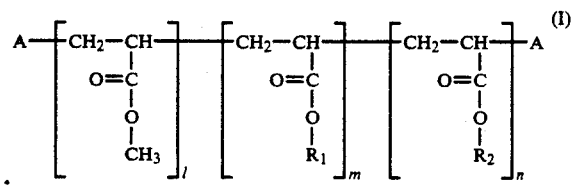

where

A represents a terminal group for polyacrylates;

$R_1$ represents an oleyl group containing up to 20 mol % stearyl groups;

$R_2$ is a residue with the formula $-(CH_2H_4O)_x(C_3H_16O)_y-CH_3$, where x is between 8 and 24, preferably between 10 and 16, and y is between 0.75 and 2.25, preferably between 1 and 2;

l is between 1 and 3;

m is between 0.85 and 3.5;

n is between 0.12 and 0.5.

The objects of the invention are also satisfied by a method of forming a reverse emulsion using the emulsifying agent of formula (I), above.

Further objects of the invention are satisfied by a heavy reverse emulsion without solids comprising: 10 to 70% by volume of a dispersed brine phase having a density of between 1.20 and 2.77; 90 to 30% by volume of a continuous oil phase; and 15 to 60 g/liter of the emulsifying agent according to formula (I), above.

Still further objects of the invention are satisfied by a method of drilling wells using this heavy reverse emulsion.

BRIEF DESCRIPTION OF THE DRAWINGS

FIG. 7 shows the evolution of the electrical stability as a function of the oil/brine ratio after 48 hours and 162 hours at 150° C.

FIG. 9 shows the evolution of the plastic viscosity and the yield value as a function of the oil/brine ratio after 162 hours of aging in the dynamic mode at 150° C.

DESCRIPTION OF THE INVENTION

Figure 1:
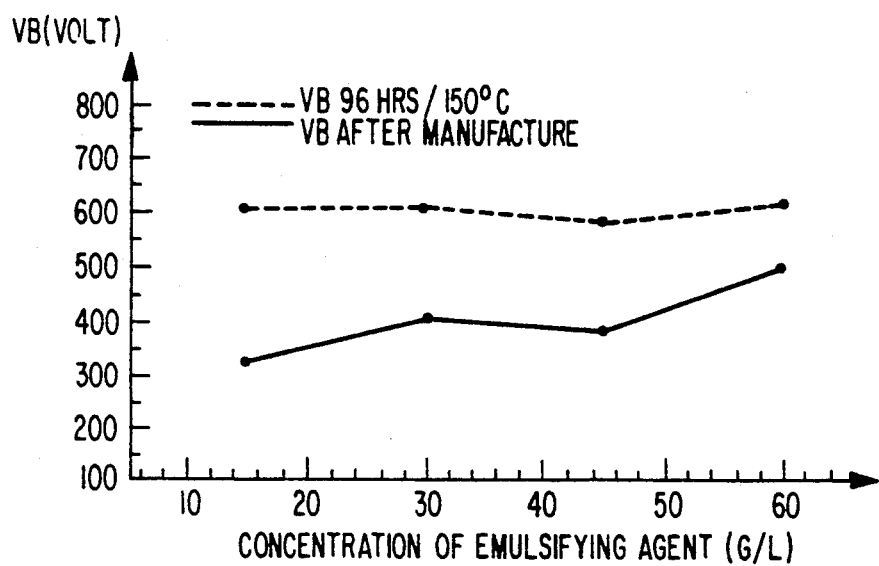
FIG. 1 shows the variation in electrical stability of the emulsion of the invention as a function of the concentration of the emulsifying agent of the invention after 96 hours at 150° C.

The optimum concentration of emulsifying agent depends on the oil and brine used, as well as the oil/brine ratio by volume.

The brine used in the present invention can be a simple or complex brine composed of various salts or mixtures of salts such as NaCl, $CaCl_2$, $MgCl_2$, $CaBr_2$, KCl, $CaBr_2$, or $ZnBr_2$.

In the emulsifying agent of the invention according to formula (I) x is preferably between 10 and 16; y is preferably between 1 and 2; and A preferably represents a dodecylmercaptan group. In addition, in the most preferred emulsifying agent of the present invention according to formula (I), l is 2.0; m is 1.75; n is 0.25; x is 16; and y is 1.5.

The emulsions formulated according to the present invention are particularly advantageous since they enable the following specific problems to be overcome as indicated:

Problems of Clogging: The emulsifying agent is oil-soluble and enables the production of a reverse emulsion of brine in an oil phase; no clogging due to solids is therefore to be feared in potential reservoirs to be drilled.

Problems of High Pressure: The specific mass desired for the emulsion is added using a simple or complex brine phase, and it is therefore easy to modify the mass by adjusting the density of the brine or by modifying the ratio of the oil/brine volumes.

Problems of Temperature: The emulsions of the invention are stable up to at least 150° C., as indicated in the Examples, below, in the static and dynamic modes.

When using the emulsions of the invention for drilling wells, in particular for drilling oil wells, additives such as the following can be additionally used, either alone or in combination: completion fluids; so called "work over" fluids; packer fluids; so-called "spacer" intermediate fluids; drilling fluids; and viscous plugs.

The invention is further described with reference to the following non-limiting Examples. In these Examples, all ratios and percentages are by weight unless otherwise indicated.

In all these examples, the emulsifying agent used is represented by formula (I), above, in which l was 2.0, m was 1.75, n was 0.25, x was 16, and y was 1.5. This emulsifying agent is manufactured as TEGOPREN LE 1733, by the German company T.H. GOLDSCHMIDT A.G.

EXAMPLE 1

This Example relates to the preparation and the physical characteristics of various emulsions in accordance with the invention.

1. Preparation of Emulsions

Emulsions having an oil/brine ratio of 50/50 by volume and final density of 1.56 were prepared using the following materials:
- so-called "ecotoxic" (TR2) type oil, having a density of 0.826,
- $CaBr_2$—$ZnBr_2$ brine having a density of 2.31,
- TEGOPREN LE 1733 emulsifying agent: at a concentration between 15 and 60 g/liter,
- anticorrosive: 0.4% by weight of brine.

These emulsions were prepared by dissolving the emulsifying agent in the oil phase, using magnetic stirring for 5 minutes and at ambient temperature. Using a pump (JABSCO mark model 2182000), the brine was slowly incorporated into the oil phase. The solution was then maintained with stirring for a variable period of time depending on the amount of emulsion manufactured. For a volume of one liter of emulsion for example the minimum stirring time was one hour.

The temperature of the mixture was regulated below 40° C. After total dispersion of the brine in the oil the anticorrosive was incorporated by mixing using the JABSCO pump.

2. Tests Carried Out on the Emulsions

The rheological and electrical stability characteristics of the emulsions were measured using API norms. Both static and dynamic aging tests were carried out at 150° C.

The graph of FIG. 1 shows the variation in electrical stability as a function of the concentration of the emulsifying agent, after manufacture and after maintenance at 150° C. for 96 hours. FIG. 1 shows that there exists a minimum threshold of concentration in emulsifying agent of 15 g/liter below which the emulsion was unstable. An improvement in electrical stability was noted after aging, with this improvement being less substantial above a concentration of emulsifying agent of approximately 45 g/liter. The electrical stability was maintained after aging above a concentration of 35 to 40 g/liter of emulsifying agent.

Figure 2:
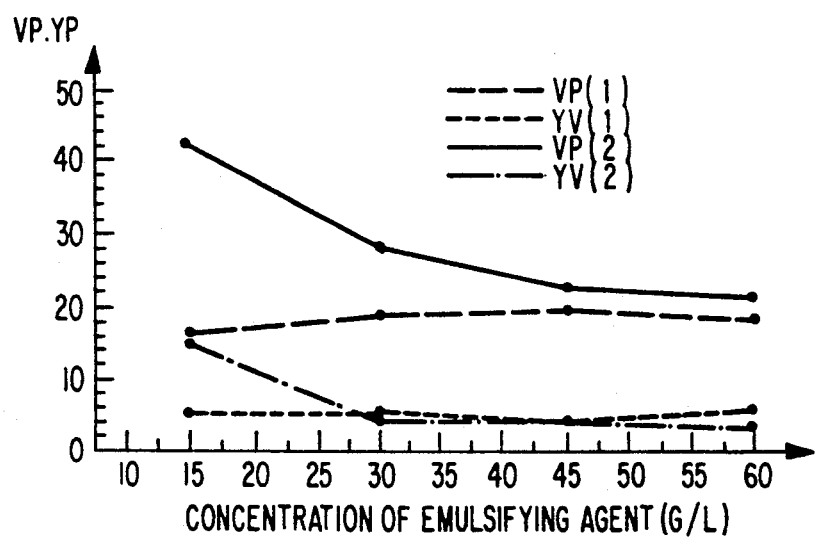
FIG. 2 shows the variations in the plastic viscosity of the yields as a function of the concentration of the emulsifying agent of the invention after 96 hours at 150° C.

The graphs of FIG. 2 illustrate the variations in the plastic viscosity VP and in the Yield Value YV as a function of the concentration of emulsifying agent after manufacture (plots VP(1) or YV(1) and after aging at 150° C. for 96 hours (plots VP(2) and YV(2)). These rheological characteristics were even greater for concentrations of emulsifying agent between 15 and 30 g/liter. The VP and YV values varied inversely to the concentration of emulsifying agent, after aging at 150° C. The high increase in the concentration of emulsifying agent between 35 to 60 g/liter had only a slight influence on the rheological characteristics, both before and after aging.

Figure 3:
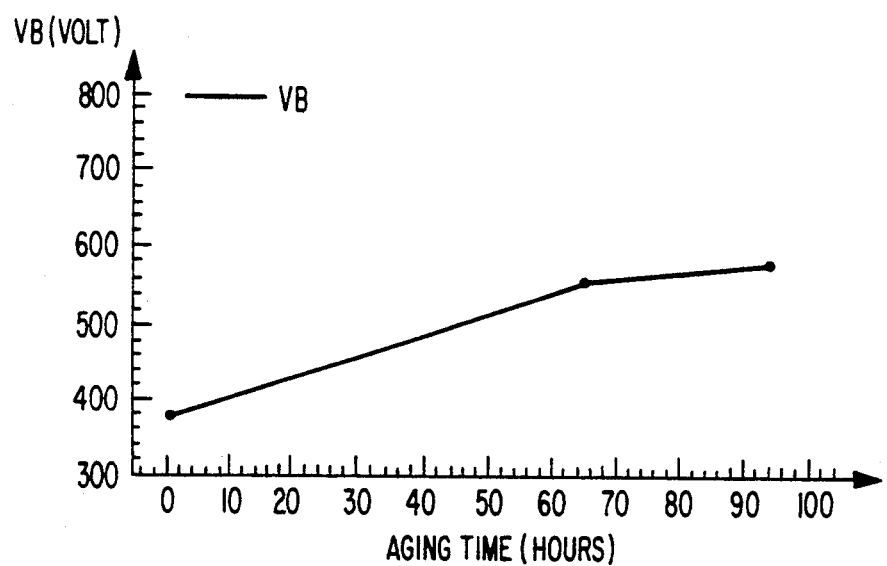
FIG. 3 shows the variation in the electrical stability of the emulsion of the invention as a function of the aging time.

FIG. 3 illustrates the variation in the electrical stability VB in the dynamic mode as a function of the aging time, when the concentration of the emulsifying agent was 45 g/liter. A very clear increase was noted in the electrical stability of the emulsion as a function of the aging time. This evolution was less noticeable between 60 and 96 hours.

Figure 4:
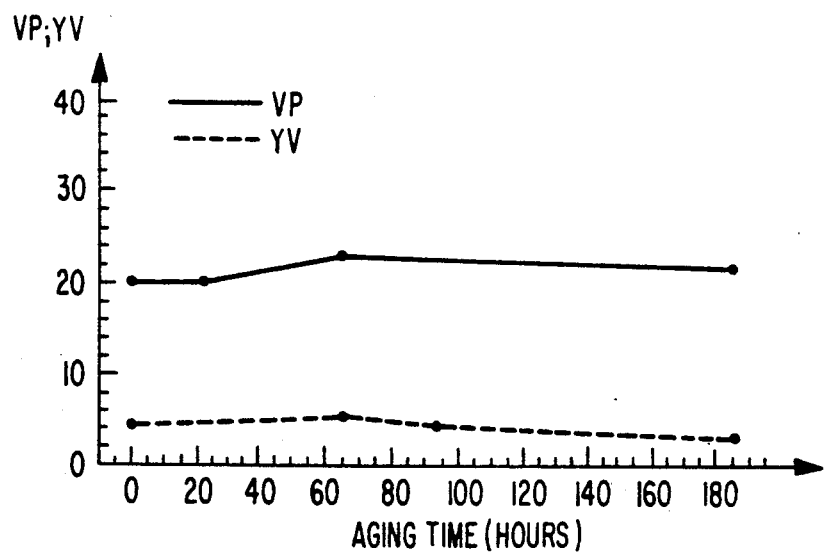
FIG. 4 shows the evolution of the plastic viscosity as a function of aging time.

FIG. 4 represents the evolution of the plastic viscosity VP and of the Yield Value YV as a function of the aging time in the dynamic mode when the concentration of the emulsifying agent was 45 g/liter. The rheological characteristics of the emulsion vary little with the aging, and the aging time therefore had little influence on these characteristics. It was apparent that the system can have phase separation after aging in the static mode at 150° C., after 48 hours, while it remained stable after aging at 150° C. in the dynamic mode. Below 40 g/liter of emulsifying agent, the system was unstable after aging for 48 hours at 150° C. in the static mode.

Figure 5:
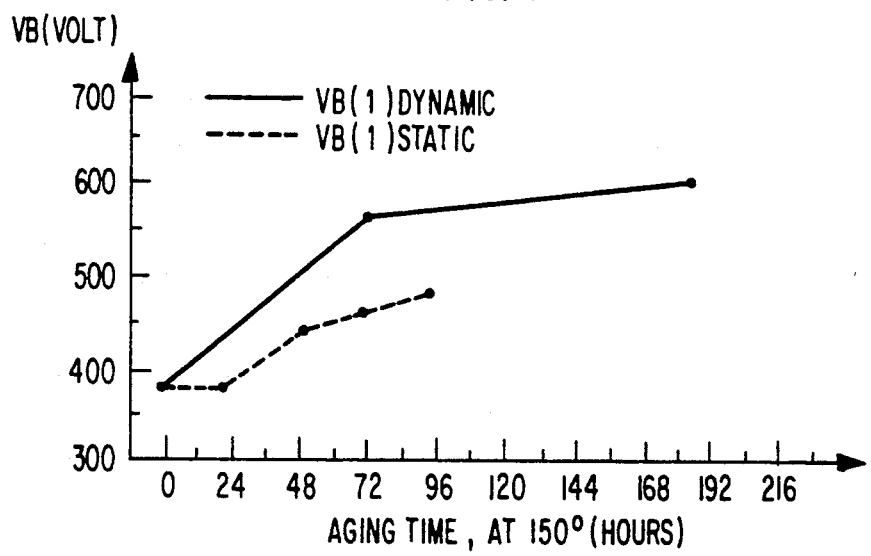
FIG. 5 shows the evolution of the electrical stability in the static mode and in the dynamic mode as a function of aging time at 150° C.

FIG. 5 shows the evolution of the electrical stability VB in the static mode and in the dynamic mode, as a function of time, when the concentration of the emulsifying agent was 45 g/liter. It can be noted that this electrical stability was weaker in the static mode than in the dynamic mode.

Figure 6:
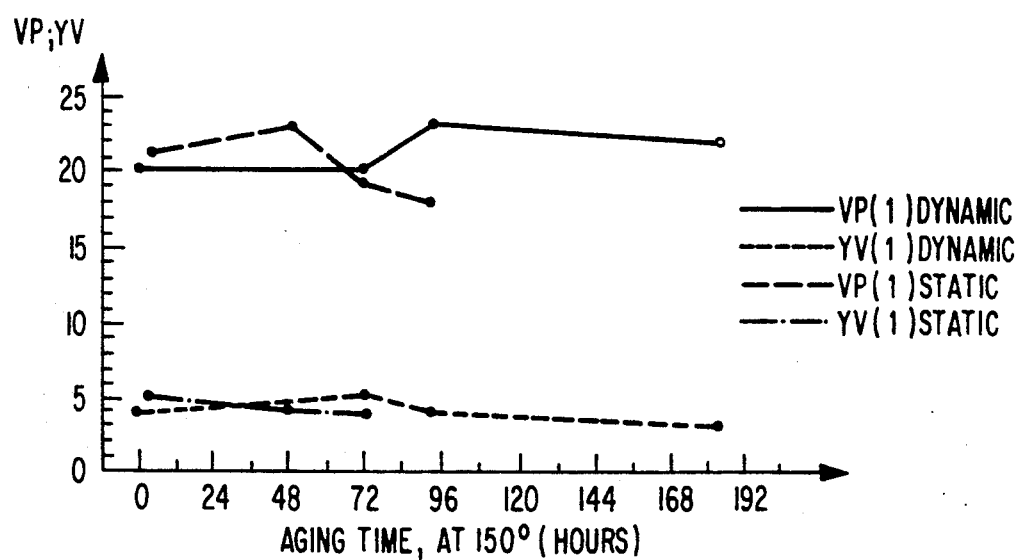
FIG. 6 shows the evolution of the plastic viscosity and the yield value as a function of the aging time at 150° C.

FIG. 6 represents the evolution of the plastic viscosity VP and of the Yield Value YV as a function of the aging time for a concentration of emulsifying agent of 45 g/liter. It can be noted that the plastic viscosity was stable in dynamic aging, while it had a tendency to fall slightly in static aging. The Yield Value remained stable and was not affected by the method of aging.

The influence of the H/S (oil/brine) volumetric ratio on the electrical stability of the emulsion and on its rheological characteristics was also studied.

FIG. 7 represents the evolution of the electrical stability VB as a function of the H/S ratio immediately after manufacture of the emulsion, after aging for 48 hours, and after aging for 162 hours respectively in the dynamic mode at 150° C.

Figure 8:
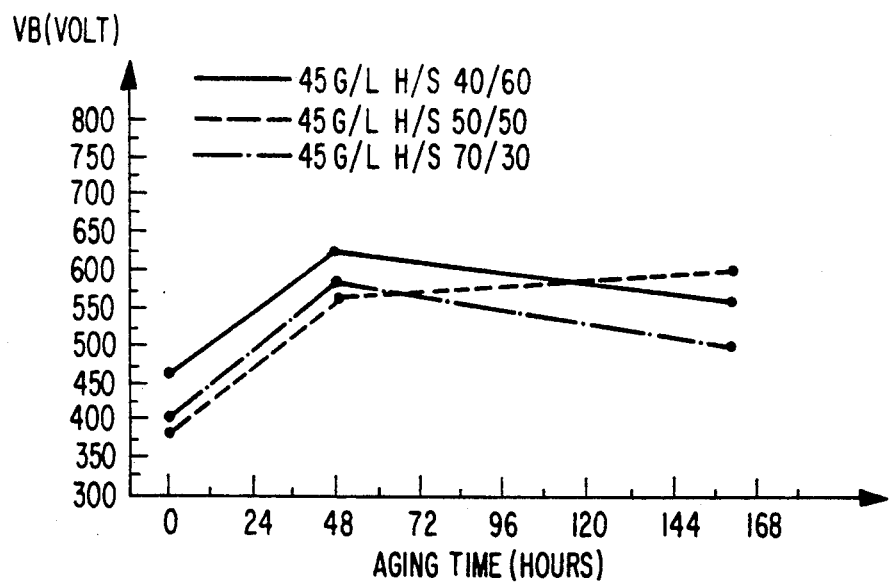
FIG. 8 shows the evolution of the electrical stability as a function of the aging for different oil/brine ratios when the concentration of the emulsifying agent is 45 g/liter.

FIG. 8 shows the evolution of the electrical stability as a function of the aging for different H/S ratios when the concentration of the emulsifying agent was 45 g/liter. It can be noted that it was only for an H/S ratio of 50/50 that the aging had a favorable influence on the stability.

FIG. 9 illustrates the evolution of the plastic viscosity VP and of the Yield Value YV as a function of the H/S ratio after manufacture of the emulsion (graphs VP(1) and YV(1)) and after 162 hours of aging in the dynamic mode at 150° C. It can be noted that an increase in the concentration of brine increased the rheological characteristics of the emulsion. For an H/S ratio of 40/60, the plastic viscosity increased as a function of the aging time.

The Yield Value was slightly sensitive to the aging time. It remained high for H/S ratios of 40/60 but fell very rapidly as soon as the H/S ratio reaches 70/30, and even after 50/50.

EXAMPLE 2

This example relates to emulsions having a final density of 1.15. It was produced with a single salt brine ($CaBr_2$) (having a density of 1.49 when the H/S ratio was 50/50 by volume), and a density of 1.66 when the H/S ratio was 60/40 by volume). a 200 HDF oil having a density of 0.817, and the emulsifying agent concentration was varied from 25 to 45 g/liter.

Figure 10:
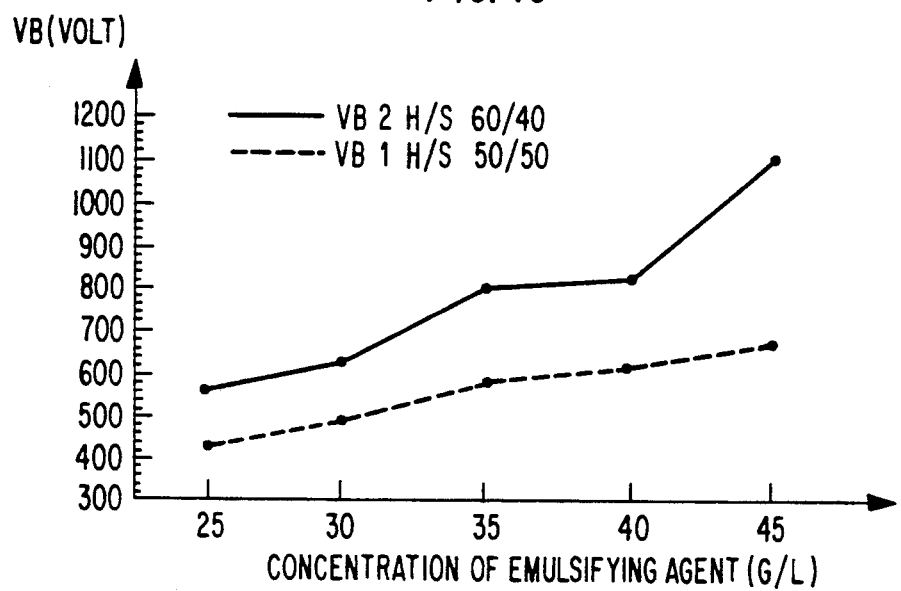
FIGS. 10 and 11 show the variation in the electrical stability as a function of the concentration of the emulsifying agent after aging in the dynamic mode at 150° C. for 114 hours.
Figure 11:
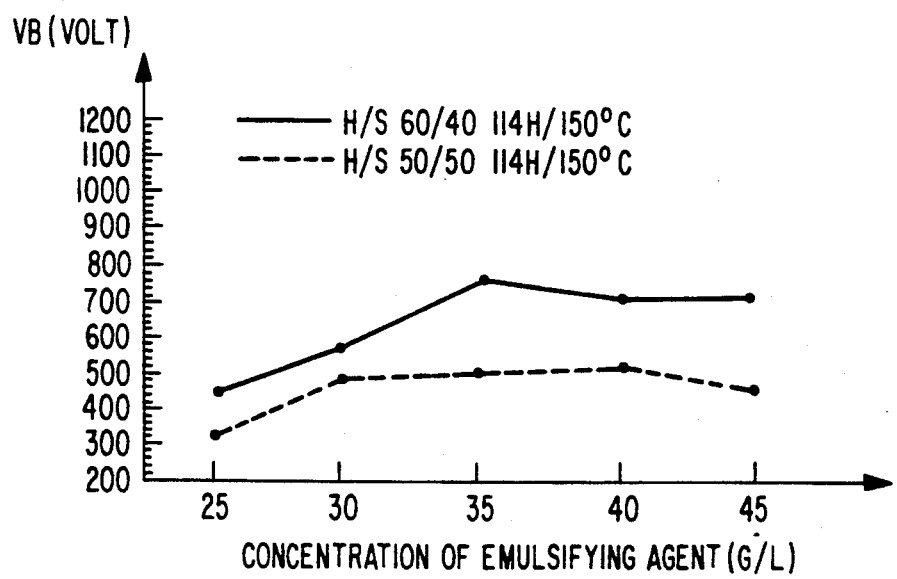

FIGS. 10 and 11 represent variations in the electrical stability VB as a function of the concentration of the emulsifying agent, after manufacture of the emulsion and after aging in the dynamic mode at 150° C. for 114 hours. It can be noted that immediately after manufacture, whatever the H/S ratio under consideration, the increase in the concentration of emulsifying agent was translated into an increase in electrical stability. This evolution was much more noticeable for the H/S ratio 60/40. . As a general rule, after aging at 150° C. for 114 hours, these emulsions were stable, and the electrical stability remained higher when the H/S ratio was 60/40 than when it was 50/50. Aging did not increase the electrical stabilities. Above the concentration of 35 g/liter of emulsifying agent, there was no increase in the stability for the H/S ratios of 50/50 or 60/40.

Figure 12:
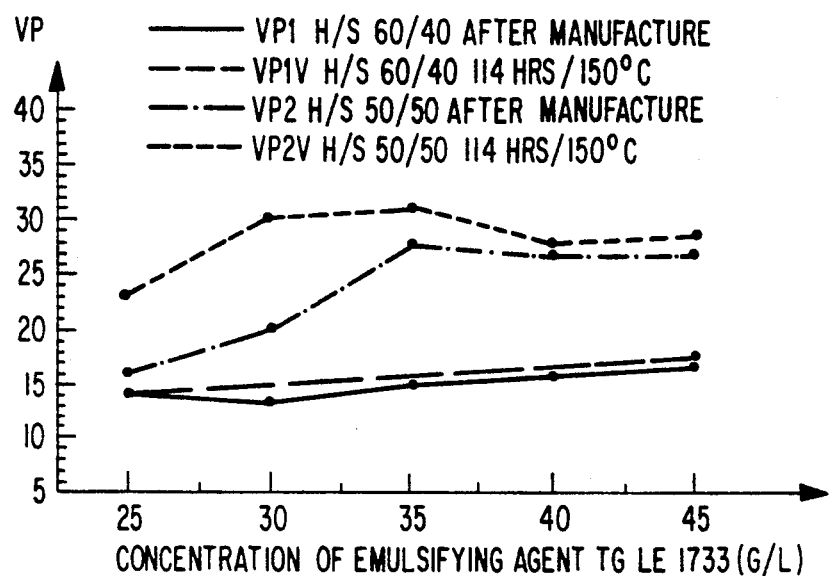
FIGS. 12 and 13 show the variation of the plastic viscosity and the yield value as a function of the concentration of the emulsifying agent for various oil/brine ratios after aging in dynamic mode for 114 hours at 150° C.
Figure 13:
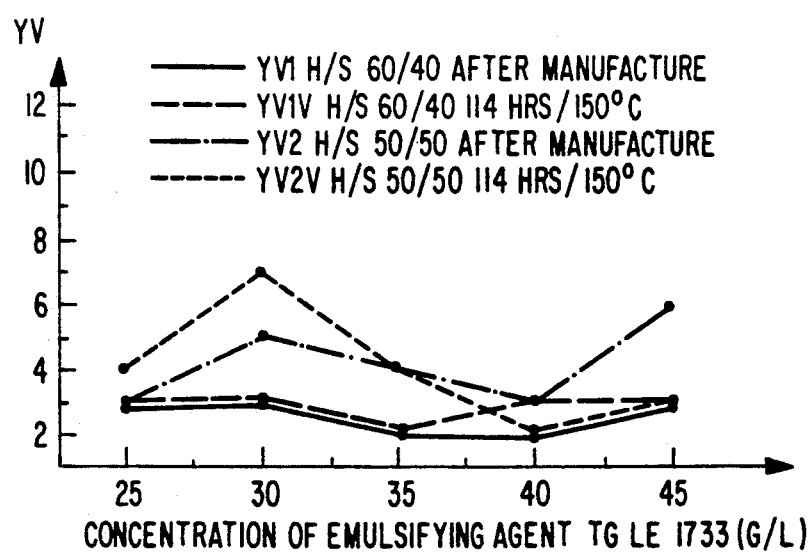

FIGS. 12 and 13 each represent variations of plastic viscosity VP and of the Yield Value YV as a function of the concentration of emulsifying agent, for various H/S ratios, after manufacture of the emulsion and its aging in the dynamic mode at 150° C. for 114 hours. It can be noted that, after manufacture, the plastic viscosity was greater for a 50/50 ratio than for a 60/40 ratio. For an H/S ratio of 50/50, the evolution of the plastic viscosity was no longer substantial after a concentration of 35 g/liter of emulsifying agent.

After aging in dynamic mode at 150° C. for 114 hours the following observations were made:
 At the H/S ratio of 60/40, there was no substantial increase of VP and YV.
 At the H/S ratio of 50/50, VP increased substantially as the concentration of emulsifying agent increased from 25 to 35 g/liter. VP then stabilized at a concentration of from 35 g/liter up to 45 g/liter. YV increased substantially as the concentration of the emulsifying agent increased from 25 to 30 g/liter, then had a tendency to decrease as soon as the concentration was greater than 30 g/liter.

In addition, after aging the emulsion the Yield Value was lower at concentrations of 40-45 g/liter of emulsifying agent, than at manufacture.

When the H/S ratio was 60/40 or 50/50 and the concentration of the emulsifying agent was fixed at 35 g/liter, a sedimentation of the heavy dispersed phase was observed after aging for 70 hours at 150° C. in the static mode. This sedimentation does not result in phase separation of the emulsion because slight stirring was sufficient to rehomogenize it.

EXAMPLE 3

Emulsions having a density of 1.15 were prepared with 200 HDF oil having a density of 0.817; brines having a density varying between 1.33 and 1.41 and containing as salt(s) either $CaBr_2$; $ZnBr_2$, or a $CaBr_2ZnBr_2$ mixture; with an H/S ratio by volume of 44/56; and with the emulsifying agent at a concentration of 35 g/liter.

Figure 14:
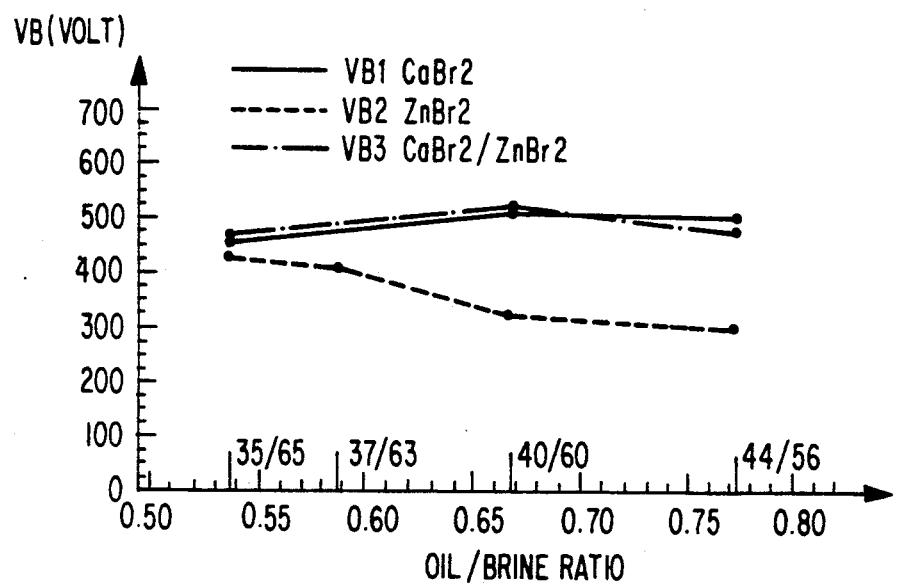
FIGS. 14 and 15 show the evolution of the electrical stability of the emulsions as a function of the oil/brine ratios after aging in the static mode for 166 hours at 150° C.
Figure 15:
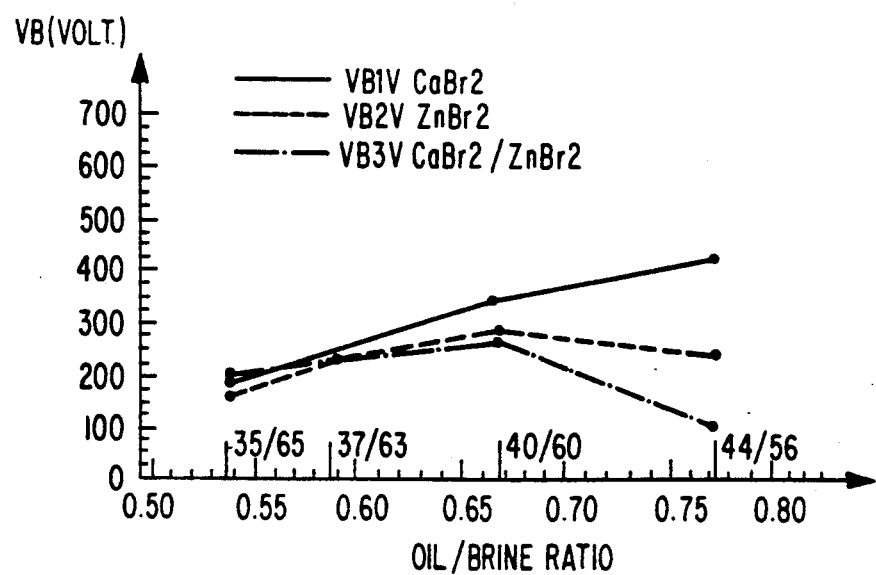
Figure 16:
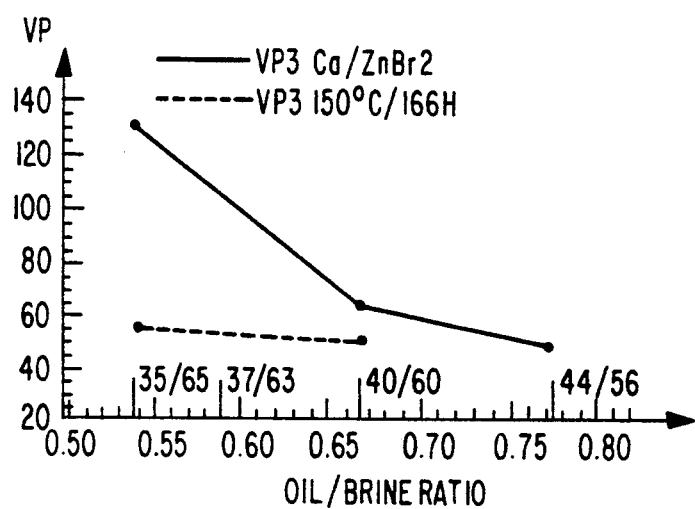
FIGS. 16, 17, 18, 19, 20, and 21 show the evolution of the plastic viscosity and the yield of the emulsions as a function of the oil/brine ratio, for emulsions based on $CaBr_2-ZnBr_2$, $ZnBr_2$, and $CaBr_2$ respectively, after aging in static mode at 150° C. for 166 hours.
Figure 17:
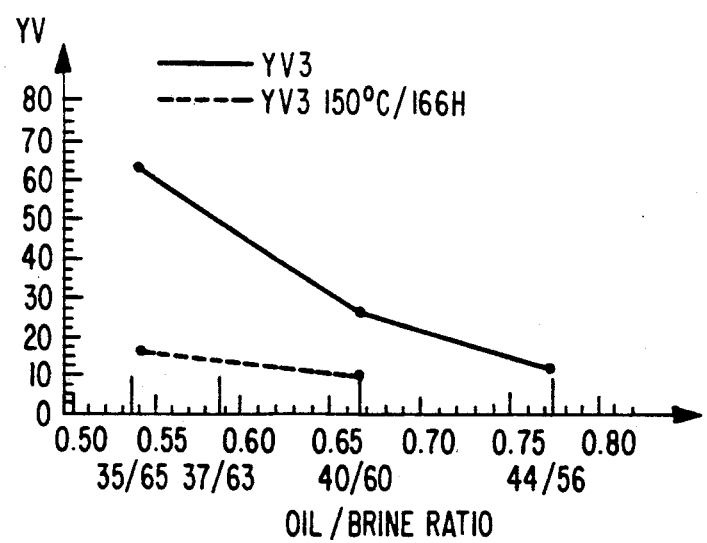
Figure 18:
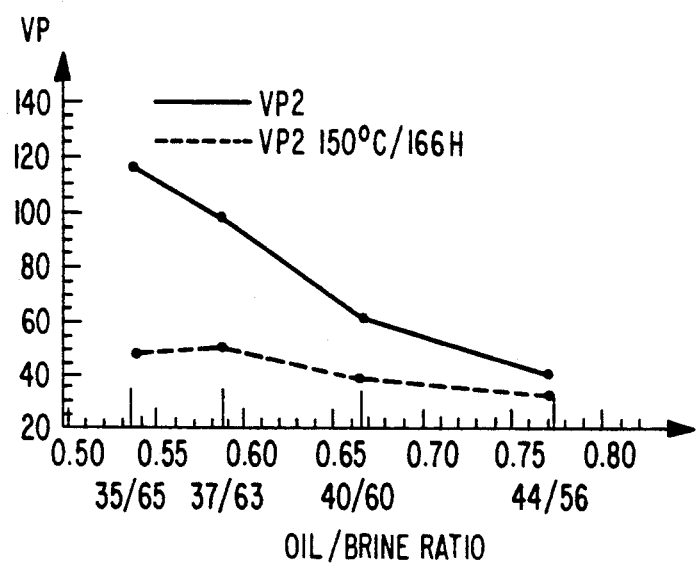
Figure 19:
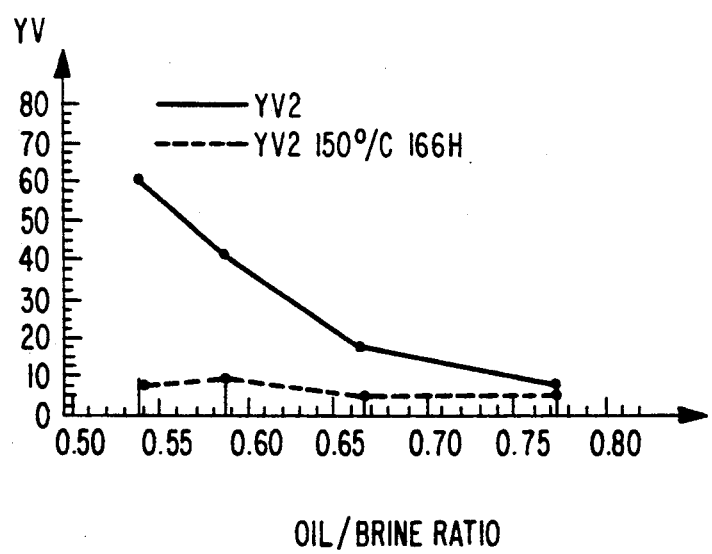
Figure 20:
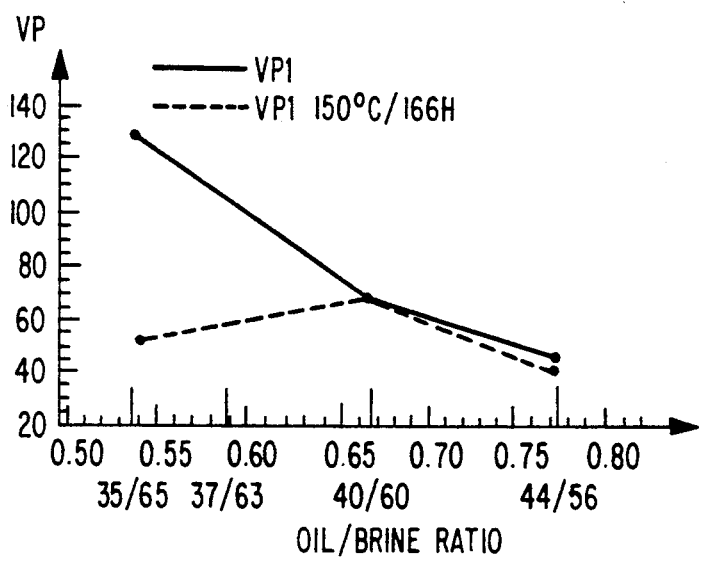
Figure 21:
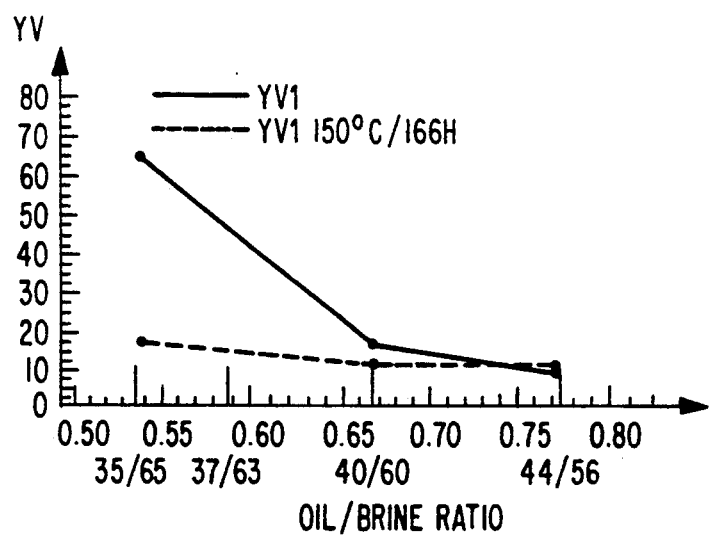

FIGS. 14 and 15 represent the evolution of the electrical stability of the emulsions as a function of the H/S ratio, respectively after manufacture of the emulsions and after their aging in the static mode at 150° C. for 166 hours. It can be noted that at manufacture the variation of the H/S ratio did not involve substantial modifications in the electrical stability for brines based on $CaBr_2$. On the other hand, there was a drop in electrical stability with the brine based on $ZnBr_2$. Thus, the level of stability depended on the type of salt used in the emulsion.

After aging at 150° C. in the static mode, the electrical stability increased for the $CaBr_2$ brine. In addition, if the H/S ratio decreased (H/S<44/56), the electrical stability dropped, which confirms a destabilization of the emulsion when the H/S ratio is 35/65.

FIGS. 16, 17, 18, 19, 20, and 21 represent the evolution of the plastic viscosity VP and of the Yield Value of the emulsions as a function of the H/S ratio for emulsions based on $CaBr_2$—$ZnBr_2$, $ZnBr_2$, and $CaBr_2$ respectively, after manufacture of the emulsions and after aging in the static mode at 150° C. for 166 hours. It can be noted that after manufacture the decrease in the H/S ratio resulted in a strong decrease in the viscosity of the emulsion, no matter what type of brine was used.

After aging at 150° C. in the static mode, a decrease of the H/S ratio had the following consequences:
 a drop in VP and YV regardless of the type of brine;
 a decrease in YV, which is more substantial for the $ZnBr_2$ brine than for the $CaBr_2$ and $CaBr_2$—$ZnBr_2$ brines;
 a non-continuous evolution of VP for the $CaBr_2$ brine, before and after aging, except when the H/S ratio was 40/60;
 a tendency for the plastic viscosity to drop for the brines based on $CaBr_2$—$ZnBr_2$ and $ZnBr_2$, both before and after aging.

EXAMPLE 4

This example describes the effect of contamination of a stable emulsion prepared in accordance with the invention with an FGN clay or soft water.

An emulsion having a final density of 1.15 and an H/S ratio by volume of 40/60 was prepared using a 100 HDF oil having a density of 0.817, a brine based on $CaBr_2$ having a density of 1.376, and 35 g/liter of the emulsifying agent.

Contamination tests with clay FGN as a filler have been carried out with clay rates of 25, 50, 75, 100, 125 and 150 g/liter of emulsion. No phase separation of the emulsion was noted, even after an addition of 150 g/liter of clay.

Figure 22:
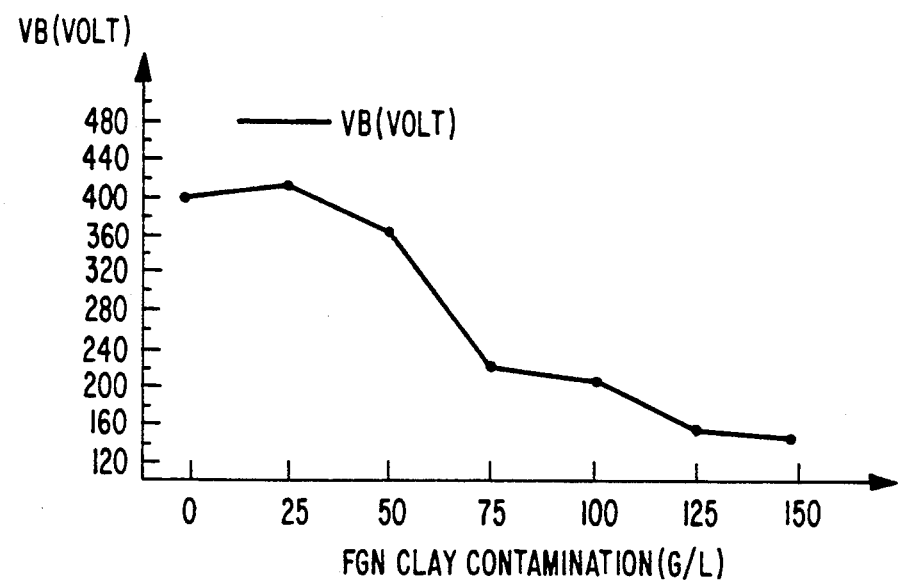
FIG. 22 shows the variations in the electrical stability as a function of the amount of clay added, expressed in g/liter of emulsion after aging of the emulsion in the dynamic mode at 150° C. for 72 hours.
Figure 23:
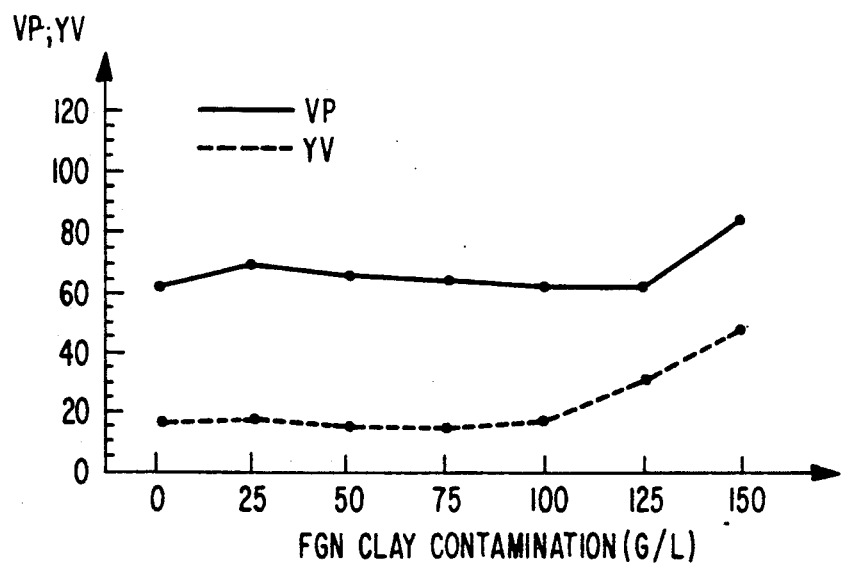
FIG. 23 shows the variations in plastic viscosity and yield as a function of the amount of clay after aging of the emulsion in the dynamic mode at 150° C. for 72 hours.

The effects of contaminating the emulsion with clay are illustrated by FIG. 22, which shows the variations in the electrical stability VB as a function of the amount of clay added, expressed in g/liter of emulsion, and by FIG. 23, which shows the variations in plastic viscosity VP and Yield Value YV as a function of the amount of clay added. In both cases the tests were carried out after aging of the emulsion at 150° C. for 72 hours in the dynamic mode.

As soon as the concentration of clay was greater than 50 g/liter, a very high drop in electrical stability was noted. This decrease in stability did not create a phase separation of the emulsion. No sedimentation was noted after 24 hours of rest. After aging for 24 hours at 150° C. in the dynamic mode, the emulsion remained stable.

VP and YV remained stable after contamination with clay up to concentrations of 100 g/liter. Above that concentration, the contamination was too great and very high values for YV and VP were observed.

Figure 24:
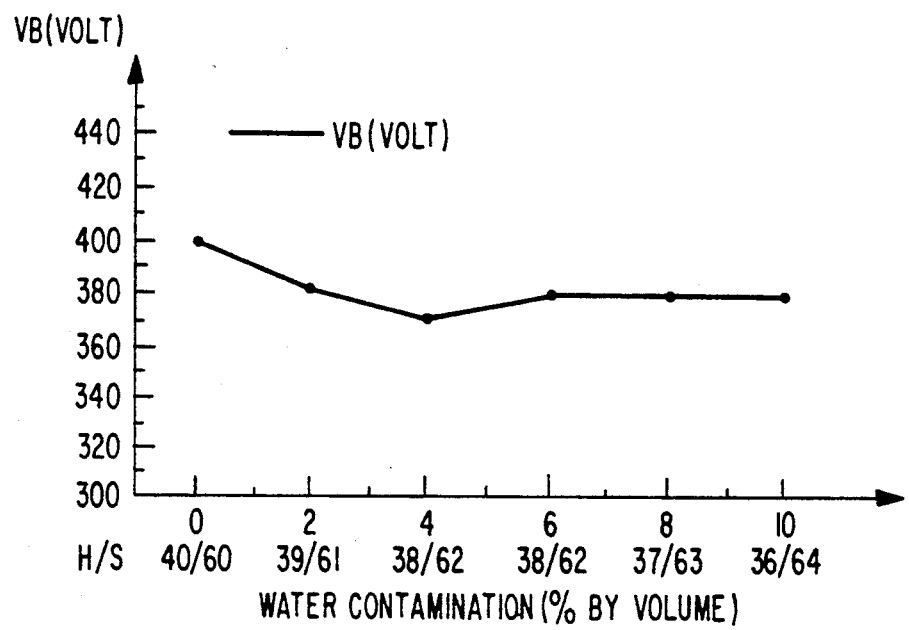
FIG. 24 shows the variations in electrical stability as a function of the water contamination expressed in % by volume, after aging of the emulsion in dynamic mode for 72 hours at 150° C.

Using the same emulsion, contamination tests were carried out with soft water using 0, 2, 4, 6, 8 and 10% of soft water to the total volume of the emulsion. This produced H/S ratios varying from 40/60 to 36/64. FIG. 24 shows the variations in electrical stability as a function of water contamination expressed in % by volume after aging of the emulsion in the dynamic mode for 72 hours at 150° C.

No particular variation in electrical stability was noted up to a contamination of 10% soft water by volume.

Figure 25:
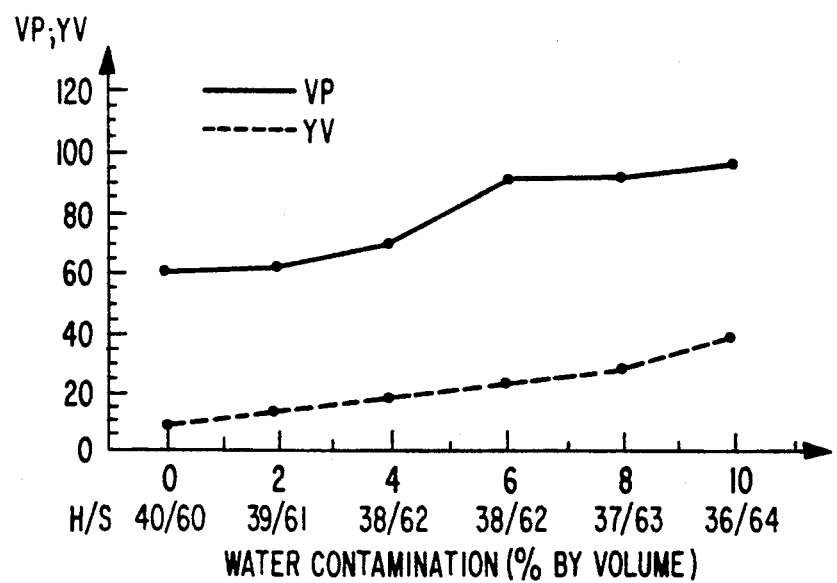
FIG. 25 shows the variations in the plastic viscosity yield of the emulsion as a function of the amount of soft water contamination, expressed in % by volume of water, after aging of the emulsion in dynamic mode for 72 hours at 150° C.

FIG. 25 shows the variations in plastic viscosity VP and Yield Value YV of the emulsion as a function of the amount of soft water contamination, expressed in % of water by volume after aging of the emulsion in the dynamic mode for 72 hours at 150° C. There was noted a continuous increase in rheological characteristics (VP and YV) as soon as the emulsion was contaminated with water. This variation became very large after 4% water contamination.

EXAMPLE 5

This Example illustrates the usefulness of reverse emulsion fluids without solids according to the invention used as completion fluids in oil drillings.

Tests were carried out on a Hassler type permeability measuring cell.

The Hassler assembly consists of a soil sample (core) in a flexible rubber tube. At each end of the core are extended steel heads that permit the injection or recovery of fluids at either end as well as the measurement of the pressure. Sealing is provided by inflating the rubber tube with a liquid under pressure.

The calculation of the permeability is carried out using Darcy's Law. Under Darcy's Law, for a given core of fixed geometric characteristics, at constant temperature, the permeability is a function of the differential pressure and of the flow of fluid in the core. Using a pump with a constant flow, the measurement of permeability comes from measuring the variations of differential pressure in the core. The emulsion used had a density of 1.57 and an H/S ratio of 50/50 it was composed of a TR3 oil, a brine based on $CaBr_2$—$ZnBr_2$, with an H/S ratio of 50/50, and 30 g/liter of the emulsifying agent. The emulsion had undergone aging for 72 hours at 150° C. in the dynamic mode.

The standardized tests were carried out under the following conditions:

Preparation of the Cores (Ground Samples)

Coring (diameter 40 mm—length 60 mm).
Drying for 16 hours at 100° C.
Cleaning and washing the cores with toluene.
Drying for 16 hours at 100° C.
Saturation with Kerdane (registered mark) under a vacuum for 24 hours.

Initial Permeability in Both Directions (A⟷B)

Measurement of the initial permeability (Ki) with a distillation cut (185° C.–235° C.) of the Kerdane type.
Measurement of the permeability in both directions from top (A) to bottom (B), and from bottom (B) to top (A) at a stabilized temperature of 65° C. and at a constant flow; the pressure, temperature and the flow were measured and recorded.

Clogging in Direction A Towards B (A→B)

The fluid being tested (reverse emulsion) was injected under a pressure of $25.10^5$ Pa, for 1.5 hours and at a temperature of 65° C., until the filtrate appeared.

Unclogging in the Direction (B→A)

The fluid remaining in the circuit was purged and Kerdane was injected, under a pressure of $35.10^5$ Pa, and at a temperature of 65° C. for 10 minutes.

Return Permeability In Both Directions (B⊖ .· A)

The measurement of the permeability was carried out at a stabilized temperature of 65° C., under a constant flow and constant pressure, under injection of Kerdane. The results obtained appear in the following Table.

TABLE

| | Permeability | |
|---|---|---|
| | First core | Second core |
| Ki B → A | 331 mda | 50 mda |
| Kr B → A | 287 mda | 27 mda |
| $\frac{Kr_{B \to A}}{Ki_{B \to A}}$ % Restoration | 86.7% | 54% |
| $Ki_{A \to B}$ | 411 mda | 50 mda |
| $Kr_{A \to B}$ | 140 mda | 28.5 mda |
| % invasion $1 - \frac{Kr_{A \to B}}{Ki_{A \to B}}$ | 66% | 43% |

These results show that this emulsion was slightly clogging for cores having an initial permeability of 400 mda (Fontaine bleau stone).

While the invention has been described with reference to the above specific embodiments, it will be apparent to one skilled in the art that various changes and modification can be made in these embodiments without departing from the spirit and scope of the invention.

What is claimed is:

1. A method of drilling wells comprising:
   forming a reverse emulsion, without solids by emulsifying;
   10 to 70% by volume of a dispersed brine phase having a density of between 1.20 and 2.77;
   90 to 30% by volume of a continuous oil phase; with 15 to 60 g/liter of an emulsifying agent according to formula (I) having a molecular weight of between 3000 to 10000:

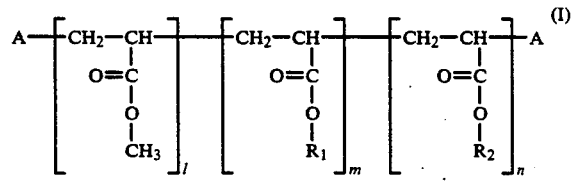

wherein
A represents a terminal group for polyacrylates;
$R_1$ represents an oleyl group or a stearyl group provided that no more than 20 mol % of the $R_1$ groups are stearyl groups;

$R_2$ is a group with the formula $-(C_2H_4O)_x(C_5H_6O)_y-CH_3$, wherein the average proportions of x and y in the $R_2$ group are as follows:

x is between 8 and 24; and y is between 0.75 and 2.25;

and the proportion of the monomer units in formula (I) is as follows:

l is between 1 and 3;

m is between 0.85 and 3.5; and n is between 0.12 and 0.5.

2. The method of drilling wells as in claim 1, wherein said emulsifying agent has a molecular weight of between 4,000 and 8,000.

3. The method of drilling wells as in claim 1, wherein x is between 10 and 16.

4. The method of drilling wells as in claim 1, wherein y is between 1 and 2.

5. The method of drilling wells as in claim 1, wherein A represents a dodecylmercaptan group.

6. The method of drilling wells as in claim 1, wherein l is 2.0, m is 1.75, n is 0.25, x is 16, and y is 1.5.

* * * * *